United States Patent
Son

(10) Patent No.: US 10,700,397 B2
(45) Date of Patent: Jun. 30, 2020

(54) BATTERY PACK

(71) Applicant: LG ELECTRONICS INC., Seoul (KR)

(72) Inventor: Ingook Son, Seoul (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 15/676,216

(22) Filed: Aug. 14, 2017

(65) Prior Publication Data

US 2018/0233790 A1 Aug. 16, 2018

(30) Foreign Application Priority Data

Feb. 15, 2017 (KR) .......................... 10-2017-0020752

(51) Int. Cl.
| | |
|---|---|
| *H01M 10/6566* | (2014.01) |
| *H01M 2/10* | (2006.01) |
| *H01M 10/625* | (2014.01) |
| *H01M 10/613* | (2014.01) |
| *H01M 10/647* | (2014.01) |

(Continued)

(52) U.S. Cl.
CPC ..... *H01M 10/6566* (2015.04); *H01M 2/1077* (2013.01); *H01M 2/12* (2013.01); *H01M 2/206* (2013.01); *H01M 10/613* (2015.04); *H01M 10/625* (2015.04); *H01M 10/647* (2015.04); *H01M 10/6557* (2015.04); *H01M 10/6562* (2015.04); *H01M 2220/20* (2013.01)

(58) Field of Classification Search
CPC ........... H01M 10/6566; H01M 10/625; H01M 10/613; H01M 10/6557; H01M 10/647; H01M 2/1077; H01M 2/12; H01M 2/206; H01M 2220/20; H01M 10/6562
See application file for complete search history.

(56) References Cited

U.S. PATENT DOCUMENTS 9,112,227 B2 * 8/2015 Tonozuka ........... H01M 2/1061
10,017,073 B2 * 7/2018 Lei ....................... H01M 10/625
(Continued)

FOREIGN PATENT DOCUMENTS

| EP | 1577966 | 9/2005 |
|---|---|---|
| EP | 1744383 | 1/2007 |

(Continued)

OTHER PUBLICATIONS

English Translation: Takashi (JP 2008/103248).*
(Continued)

*Primary Examiner* — Stephen J Yanchuk
(74) *Attorney, Agent, or Firm* — Fish & Richardson P.C.

(57) ABSTRACT

A battery pack includes a plurality of cartridges that are stackable in a vertical direction in which each cartridge of the plurality of cartridges extends in a longitudinal direction perpendicular to the vertical direction, and a plurality of battery cells in which each battery cell is disposed in a cartridge of the plurality of cartridges. Each cartridge of the plurality of cartridges includes a battery cell contact body that is configured to contact a battery cell of the plurality of battery cells and support the battery cell, and at least one duct that is configured to transmit heat from the battery cell contact body to air by passing air through the at least one duct. Each duct of the plurality of cartridges is configured to communicate air with another duct of an adjacent cartridge.

15 Claims, 9 Drawing Sheets

(51) Int. Cl.
*H01M 2/12* (2006.01)
*H01M 2/20* (2006.01)
*H01M 10/6557* (2014.01)
*H01M 10/6562* (2014.01)

(56) References Cited

U.S. PATENT DOCUMENTS

| | | |
|---|---|---|
| 2005/0208375 A1 | 9/2005 | Sakurai |
| 2008/0171259 A1 | 7/2008 | Kanai |
| 2012/0040222 A1 | 2/2012 | Quick et al. |
| 2015/0128626 A1* | 5/2015 | Guigou .............. B60H 1/00278 62/115 |

FOREIGN PATENT DOCUMENTS

| | | |
|---|---|---|
| JP | 2008103248 | 5/2008 |
| JP | 2012227120 | 11/2012 |
| KR | 10-2013-0068982 | 6/2013 |
| KR | 10-2015-0099965 | 2/2014 |
| KR | 10-2015-0118375 | 10/2015 |
| KR | 10-2016-0049888 | 5/2016 |
| KR | 1020130102502 | 11/2016 |
| KR | 1020160023380 | 1/2017 |
| KR | 1020160084223 | 7/2017 |

OTHER PUBLICATIONS

Extended European Search Report in European Application No. 17001453.4, dated Dec. 12, 2017, 11 pages (with English translation).

* cited by examiner

BATTERY PACK

CROSS-REFERENCE TO RELATED APPLICATIONS

This application claims priority under 35 U.S.C. §§ 119 and 365 to Korean Patent Application No. 10-2017-0020752 filed on Feb. 15, 2017, in Korea, the entire contents of which are hereby incorporated by reference in its entirety.

FIELD

The present disclosure relates to a battery pack, and for example, to a battery pack including cartridges and battery cells.

BACKGROUND

A battery pack is a device that can be assembled from a plurality of battery cells and that can supply power to other devices connected to the battery pack. A battery pack can be used in various industrial fields and various devices, such as mobile phones, home appliances, and vehicles.

For example, a battery pack may be mounted and used in electric vehicles that can be driven by the power from a driving motor, and the battery pack may include a plurality of battery cells and a plurality of cartridges that are configured to receive the battery cells.

The battery pack may further include cooling plates for dissipating heat from the battery cells. The cooling plates may be in contact with the battery cells and can absorb heat from the battery cells.

In some cases, the battery pack may include the cooling plates made of a metallic material with a high thermal conductivity, such as aluminum. In these cases, the cooling plates may increase the weight of the battery pack.

SUMMARY

One of the objects of the present disclosure may be to provide a battery pack that includes a relatively small number of parts, that is light, and that is able to cool a plurality of cartridges using air.

Another object of the present disclosure may be to provide a battery pack that can be made in a compact form factor.

According to one aspect of the subject matter described in this application, a battery pack includes a plurality of cartridges that are stackable in a vertical direction in which each cartridge of the plurality of cartridges extends in a longitudinal direction perpendicular to the vertical direction, and a plurality of battery cells in which each battery cell is disposed in a cartridge of the plurality of cartridges. Each cartridge of the plurality of cartridges includes a battery cell contact body that is configured to contact a battery cell of the plurality of battery cells and support the battery cell, and at least one duct that is configured to transmit heat from the battery cell contact body to air by passing air through the at least one duct. Each duct of the plurality of cartridges is configured to communicate air with another duct of an adjacent cartridge.

Implementations according to this aspect may include one or more of following features. The battery cell contact body and the duct may be integrally formed of a non-metallic material, and the duct may protrude upward relative to the battery cell contact body. The battery cell may have an upper surface that contacts a lower surface of an adjacent battery cell stacked above the battery cell.

In some implementations, each duct of the plurality of cartridges may have a lower end and an upper end, the upper end being configured to seat a lower end of a duct from an adjacent cartridge, and each duct of the plurality of cartridges may be configured to vertically communicate air with ducts of adjacent cartridges that are stacked above and below. Each cartridge of the plurality of cartridges may include a pair of ducts that are spaced apart from each other in a width direction perpendicular to the longitudinal direction.

In some implementations, the battery cell contact body may be configured to receive the battery cell in a battery cell space defined between the pair of ducts. The battery cell contact body may include: a pair of contact portions that protrude from a side surface of the pair of ducts, the pair of contact portions being spaced apart from each other in the width direction and extending in the longitudinal direction; and a pair of bridges that connect the pair of contact portions to each other, the pair of bridges being spaced apart from each other in the longitudinal direction and extending in the width direction.

In some implementations, the battery pack may further include a base that defines a return channel configured to communicate with a pair of ducts of a lowermost cartridge. The return channel may include an inlet positioned under a first duct of the pair of ducts of the lowermost cartridge, an outlet positioned under a second duct of the pair of ducts of the lowermost cartridge, and a connection channel connecting the inlet to the outlet. The base may be configured to seat the pair of ducts of the lowermost cartridge. In some examples, the base may define a recessed seat configured to receive a lowermost battery cell that is disposed in the lowermost cartridge.

In some implementations, the battery pack may further include a top plate disposed vertically above an uppermost cartridge in which the top plate includes: an upper intake duct that is configured to communicate with a first duct of the pair of ducts of the uppermost cartridge, and an upper exhaust duct that is configured to communicate with a second duct of the pair of ducts of the uppermost cartridge. In some examples, the top plate may further include a cover plate that extends from the upper intake duct to the upper exhaust duct and that covers at least a portion of an uppermost battery cell disposed in the uppermost cartridge.

In some implementations, the battery pack may further include a pressing plate that is coupled to the top plate and configured to provide a pressure to the top plate and to the uppermost cartridge. In some implementations, the battery pack may further include a lower case, and an upper case that covers a top portion of the lower case in which the upper case defines an outer intake hole located vertically above the upper intake duct, and an outer exhaust hole located vertically above the upper exhaust duct.

In some implementations, the battery pack may further include gas exhaust passages, each of the gas exhaust passages being defined between adjacent cartridges and configured to discharge gas from the battery cells in a direction perpendicular to an opening direction of the duct. In some examples, each of the battery cells may include cell leads that protrude in the longitudinal direction, each cartridge of the plurality of cartridges may include seating grooves that are configured to receive the cell leads, and the gas exhaust passages are defined between the seating grooves of the adjacent cartridges.

In some implementations, the battery pack may further include an inner cover that faces predetermined sides of the plurality of cartridges. In some cases, the inner cover may be spaced apart from the predetermined sides of the plurality of cartridges to thereby define a gap that allows flow of gas that has passed through the gas exhaust passages, and the inner cover may define an inner gas exhaust hole that is configured to discharge the gas from the gap.

In some implementations, the battery pack may further include one or more sealing members that are configured to provide a seal between the ducts of the plurality of cartridges based on the plurality of cartridges being stacked. In some examples, each cartridge of the plurality of cartridges may define sealing member grooves on top and bottom surfaces of the cartridge, the sealing member grooves being configured to receive the sealing members.

DETAILED DESCRIPTION

Figure 1:
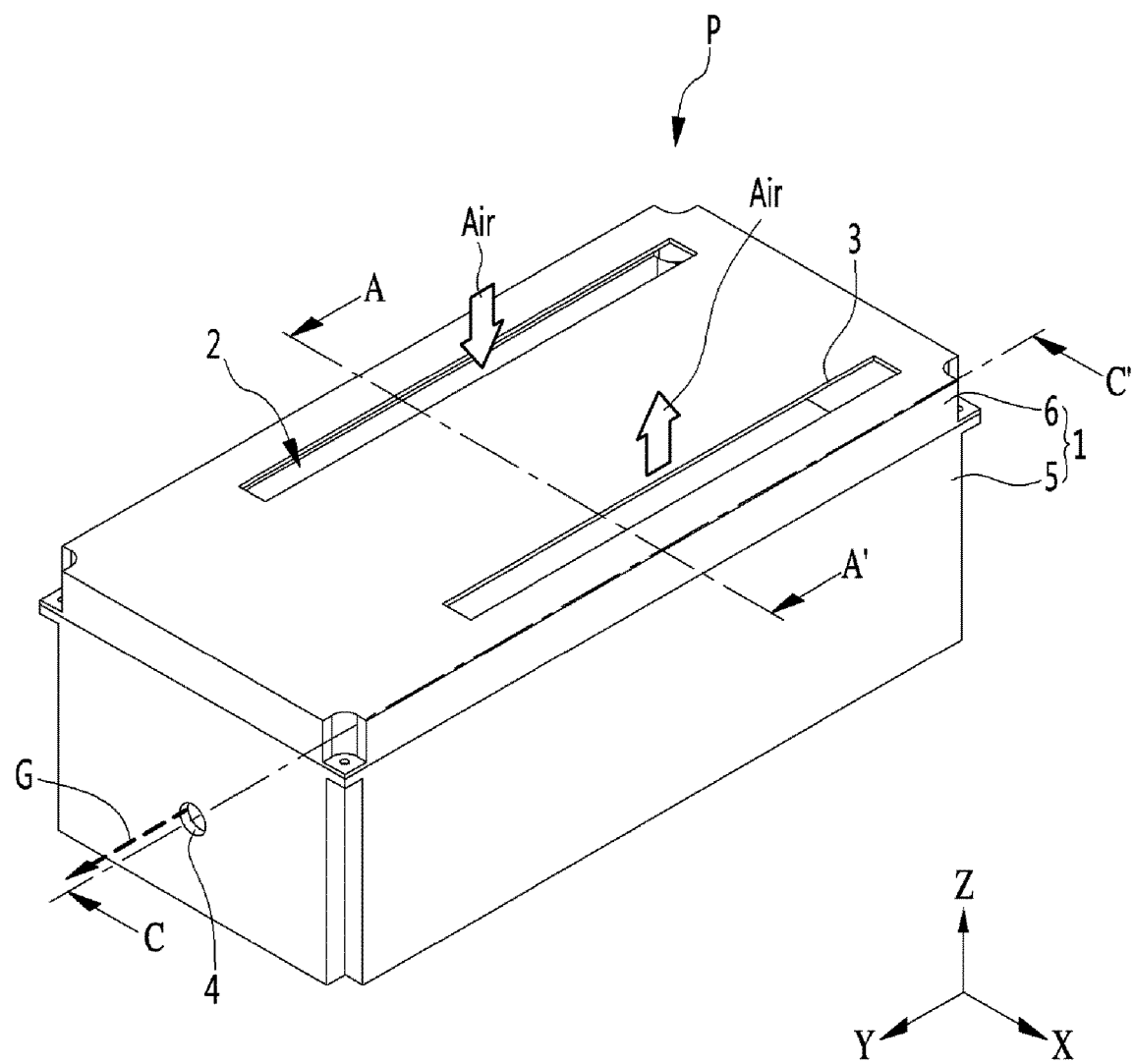
FIG. 1 is a perspective view showing an example battery pack.
Figure 2:
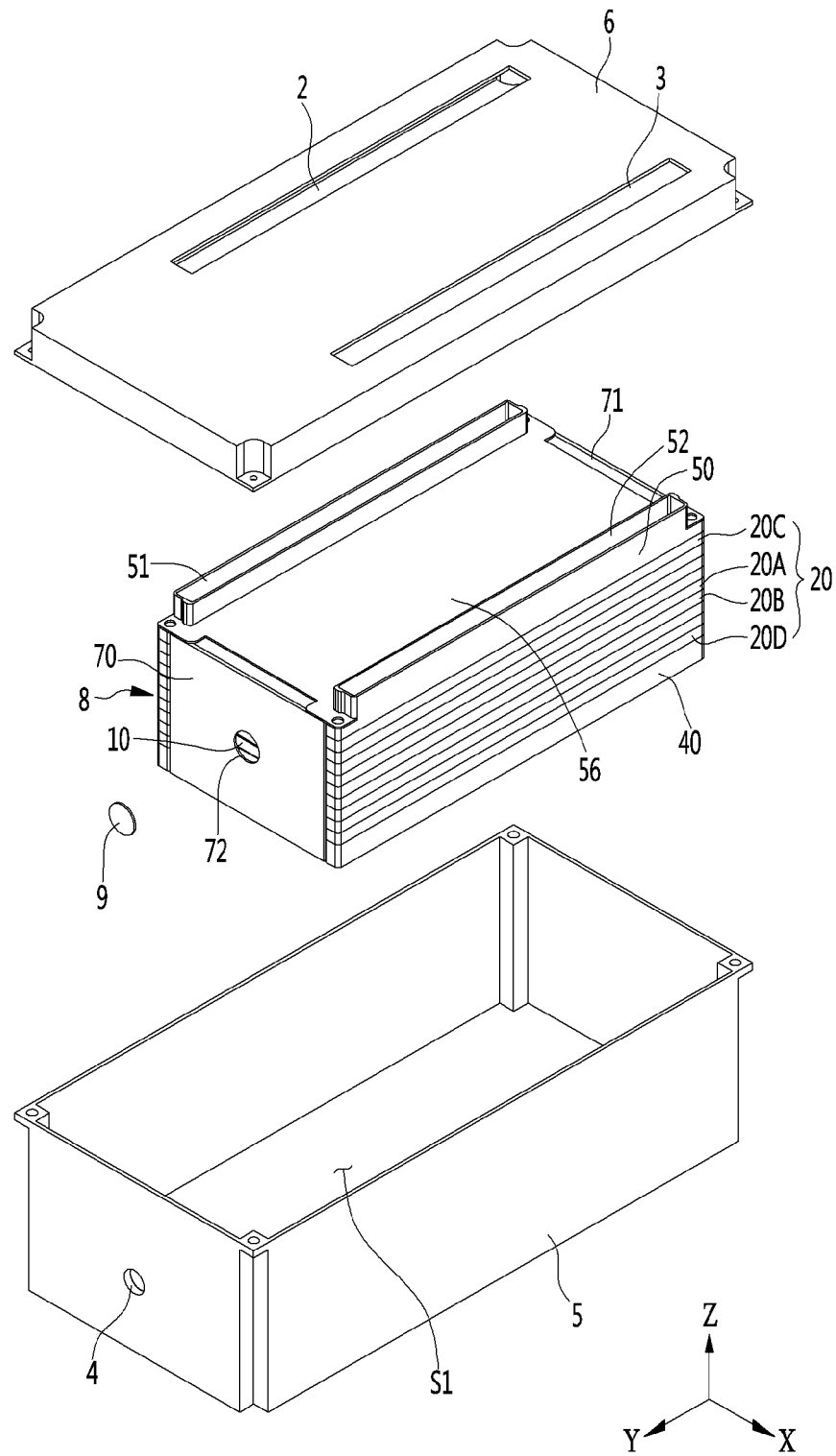
FIG. 2 is an exploded perspective view of the example battery pack shown in FIG. 1.
Figure 3:
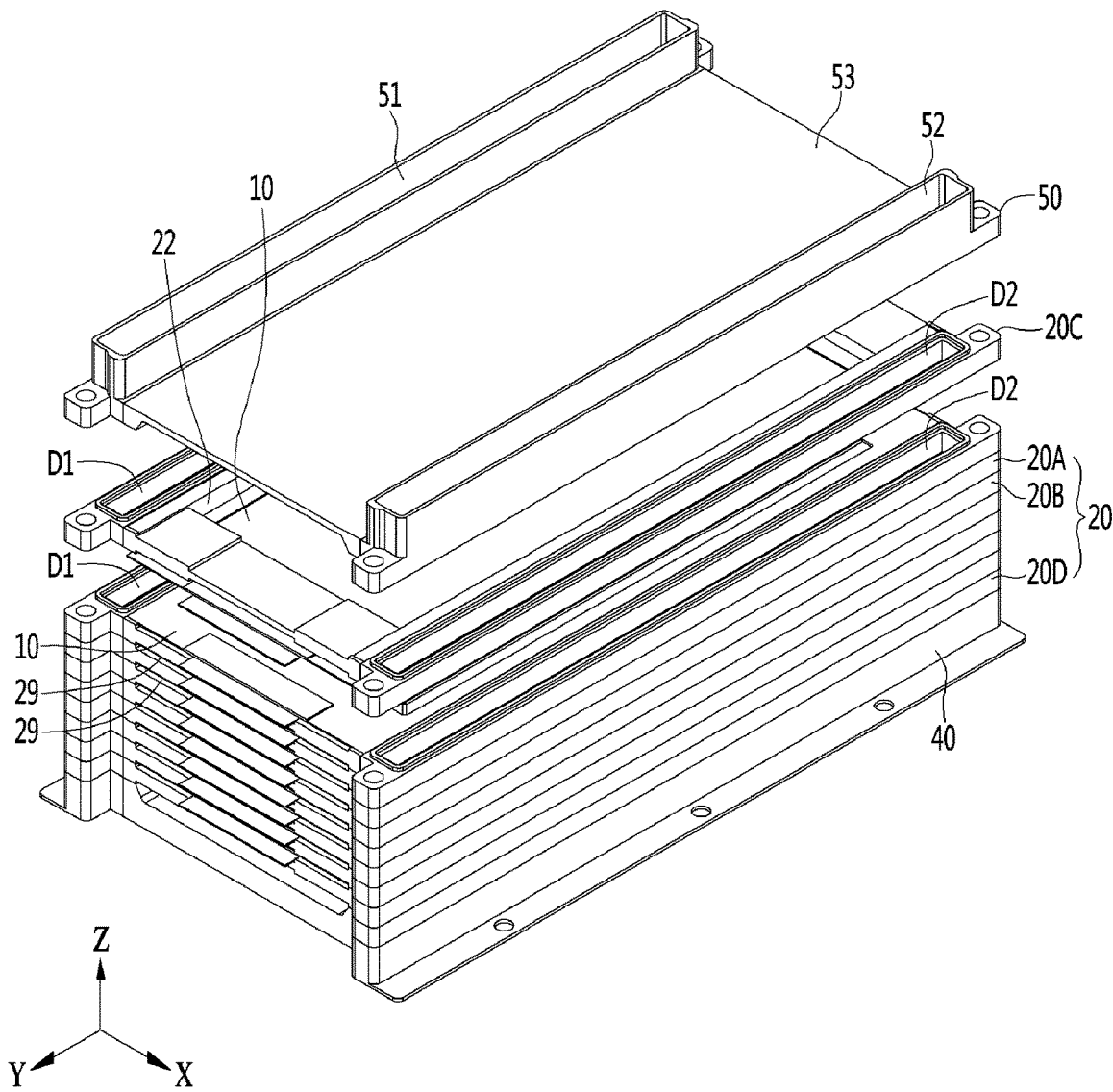
FIG. 3 is an exploded perspective view showing example battery cells and example cartridge.

FIG. 1 is a perspective view showing an example battery pack, FIG. 2 is an exploded perspective view of the example battery pack shown in FIG. 1, and FIG. 3 is an exploded perspective view showing example battery cells and example cartridges.

A battery pack may include an outer case 1 that forms the external appearance.

An outer intake hole 2 through which air for cooling the inside the battery pack P flows into the outer case 1 may be formed at the outer case 1. An outer exhaust hole 3 through which the air that has cooled the inside of the battery pack P is discharged out of the battery pack P may be formed at the outer case 1.

The battery pack P may be installed in a vehicle and may be mounted on the car body of a vehicle, for instance.

The battery pack P may be connected with an HVAC (Heating Ventilation Air Conditioning), or the inside or the outside of a vehicle through a duct.

For example, the battery pack P may be connected to an HVAC or an interior of a vehicle through an intake duct and an exhaust duct, in which the air from the intake duct can flow into the battery pack P through the outer intake hole 2 and remove the heat inside the battery pack P and the air in the battery pack P can be discharged out of the HVAC or the interior of the vehicle through the outer exhaust hole 3 and the exhaust duct.

In this case, the intake duct may be connected to the battery pack P to guide air into the outer intake hole 2 and the exhaust duct may be connected to the battery pack P to guide the air discharged out of the outer exhaust hole 3.

The intake duct may have an end connected to a portion around the outer intake hole 2 and the exhaust duct may have an end connected to a portion around the outer exhaust hole 3.

An outer gas exhaust hole 4 through which gas G discharged from battery cells in the battery pack P is discharged out of the battery pack P may be formed at the outer case 1.

The outer case 1 may have various shapes such as a polygonal shape, a hexahedron shape, and a round shape.

In some implementations, the outer intake hole 2 and the outer exhaust hole 3 may be formed through a side of the outer case 1 and the outer gas exhaust hole 4 may be formed through any one of sides of the outer case 1 except for the side with the outer intake hole 2 and the outer exhaust hole 3.

The outer intake hole 2 and the outer exhaust hole 3 may be open in parallel with each other.

The outer gas exhaust hole 4 may be open in a different direction from the outer intake hole 2 and the outer exhaust hole 3.

For example, the outer intake hole 2 and the outer exhaust hole 3 may be open vertically in the outer case 1 (in the Z-axial direction), while the outer gas exhaust hole 4 may be open horizontally in the outer case 1 (in the Y-axial direction).

In some implementations, the outer intake hole 2 and the outer exhaust hole 3 may be open horizontally in the outer case 1, while the outer gas exhaust hole 4 may be open vertically in the outer case 1.

In some implementations, all of the outer intake hole 2, the outer exhaust hole 3, and the outer gas exhaust hole 4 may be horizontally open. In these cases, the outer intake hole 2 and the outer exhaust hole 3 may be open in the left-right direction (in the X-axial direction), while the outer gas exhaust hole 4 may be open in the front-rear direction (in the Y-axial direction). In other examples, the outer intake hole 2 and the outer exhaust hole 3 may be open in the front-rear direction (in the Y-axial direction), while the outer gas exhaust hole 4 may be open in the left-right direction (in the X-axial direction).

The outer case 1 may be an assembly of a plurality of members and may include a lower case 5 and an upper case 6 covering the top of the lower case 5.

A battery module 8 may be disposed in the outer case 1.

The outer gas exhaust hole 4 may be formed at the lower case 5, and the outer intake hole 2 and the outer exhaust hole 3 may be formed at the upper case 6.

The lower case 5 may be formed in a box shape with an open top. A space S1 that is open upward may be formed inside the lower case 5 and the battery module 8 may be partially or entirely inserted and kept in the space S1 of the lower case 5.

The battery module 8 may include a plurality of battery cells 10 and a plurality of cartridges 20.

The battery cells 10 may be mounted on the cartridges 20. The battery cells 10 may be vertically stacked on the cartridges 20.

The battery cells 10 may be vertically arranged to face adjacent battery cells.

The cartridges 20 may be stacked. The cartridges 20 may be vertically arranged to face adjacent cartridges 20.

The cartridges 20 are the same in shape and size and the common configurations of the cartridges 20 are given reference numeral '20' in the following description.

Further, of two adjacent cartridges, the upper cartridge is given reference numeral '20A' and the lower cartridge which is adjacent to the upper cartridge is given reference numeral '20B' in the following description.

Further, of the cartridges 20, the uppermost cartridge is given reference numeral '20C' and the lowermost cartridge is given reference numeral '20D' in the following description.

The uppermost cartridge 20C may be an upper cartridge for the cartridge positioned right under it and is given reference numeral '20C' for the convenience of description in the following description.

Further, the lowermost cartridge 20D may be a lower cartridge for the cartridge positioned right over it and is given reference numeral '20D' for the convenience of description in the following description.

The bottom of an upper cartridge 20A may face the top of a lower cartridge 20B which is adjacent to the upper cartridge 20A. The lower end of an upper cartridge 20A may be seated on the upper end of a lower cartridge 20B which is adjacent to the upper cartridge 20A.

The cartridges 20 may each include a battery cell contact body 22 that is in contact with a battery cell 10 and one or more ducts D1 and D2 for transmitting heat of the battery cell contact body 22 to air passing through it.

The battery module 8 may include a base 40. The base 40 may form the external appearance of the bottom of the battery module 8. The lowermost cartridge 20D of the cartridges 20 may be disposed on the base 40 and the weight of the cartridges 20 may be applied to the base 40.

The battery module 8 may further include a top plate 50. The top plate 50 may be disposed over the uppermost cartridge 20C. The top plate 50 can cover the top of the uppermost cartridge 20C and the top of the uppermost battery cell in the uppermost cartridge 20C.

The battery pack P may include a membrane 9 disposed in the outer gas exhaust hole 4. The membrane 9 can prevent foreign substances from flowing inside through the outer gas exhaust hole 4. The membrane 9 may be breakable to relieve an internal air pressure when the internal pressure of the battery pack P exceeds a reference pressure. When the membrane 9 breaks, high-pressure fluid in the battery pack P may leak out of the battery pack P through the outer gas exhaust hole 4.

The battery pack P may include inner covers 70 and 71 that cover predetermined sides of the cartridges 20. The inner covers 70 and 71 may be provided in pairs inside the outer case 1. The inner covers 70 and 71 may be spaced apart from each other with the cartridges 20 therebetween and the cartridges 20 may be protected by the inner covers 70 and 71.

An inner gas exhaust hole 72 for passing gas G discharged from the battery cells 10 may be formed at any one 70 of the inner covers 70 and 71. The gas G discharged from the battery cells 10 may pass through the inner gas exhaust hole 72 and then may be discharged outside through the outer gas exhaust hole 4.

Figure 4:
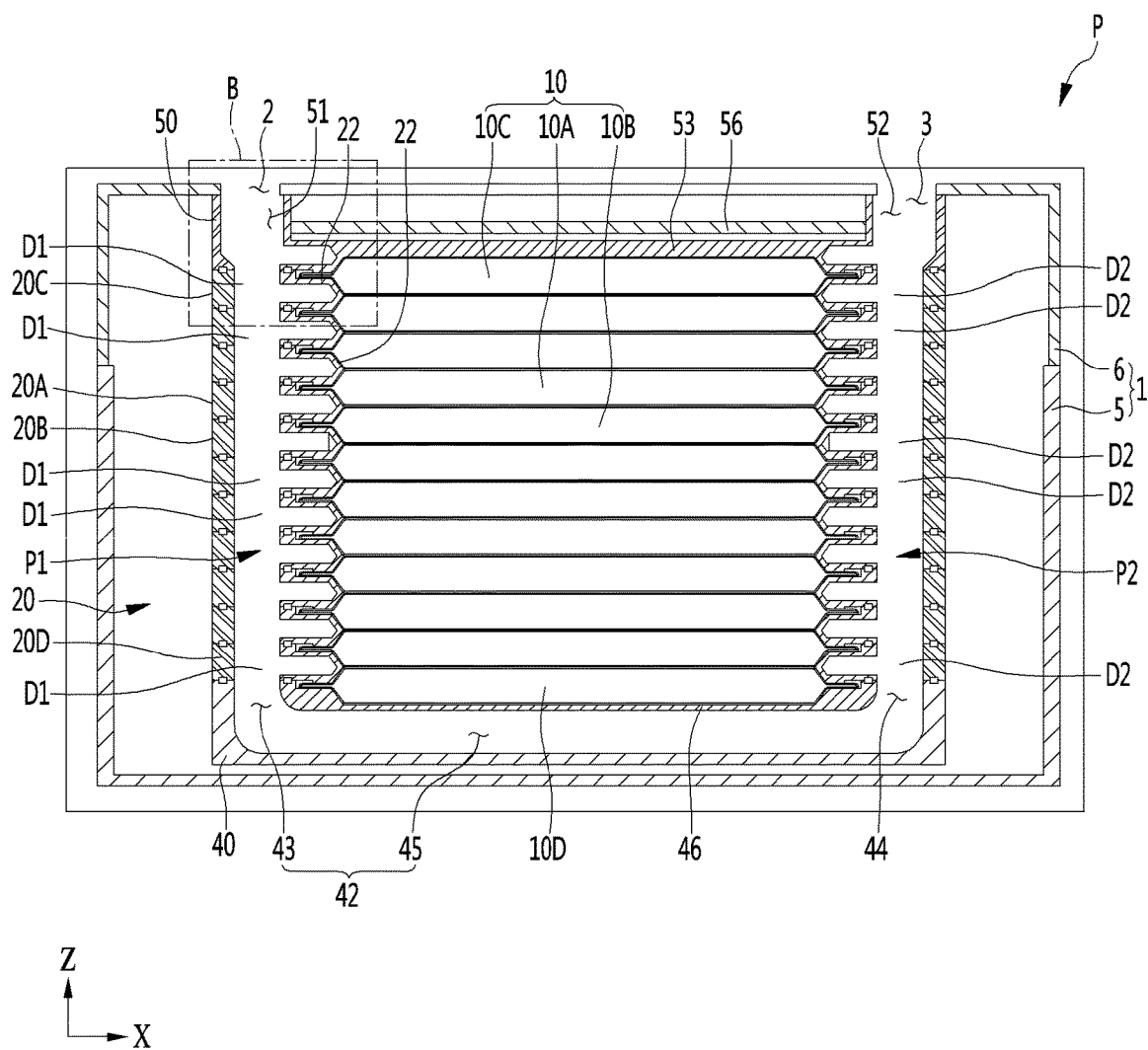
FIG. 4 is a cross-sectional view taken along line A-A' shown in FIG. 1.
Figure 5:
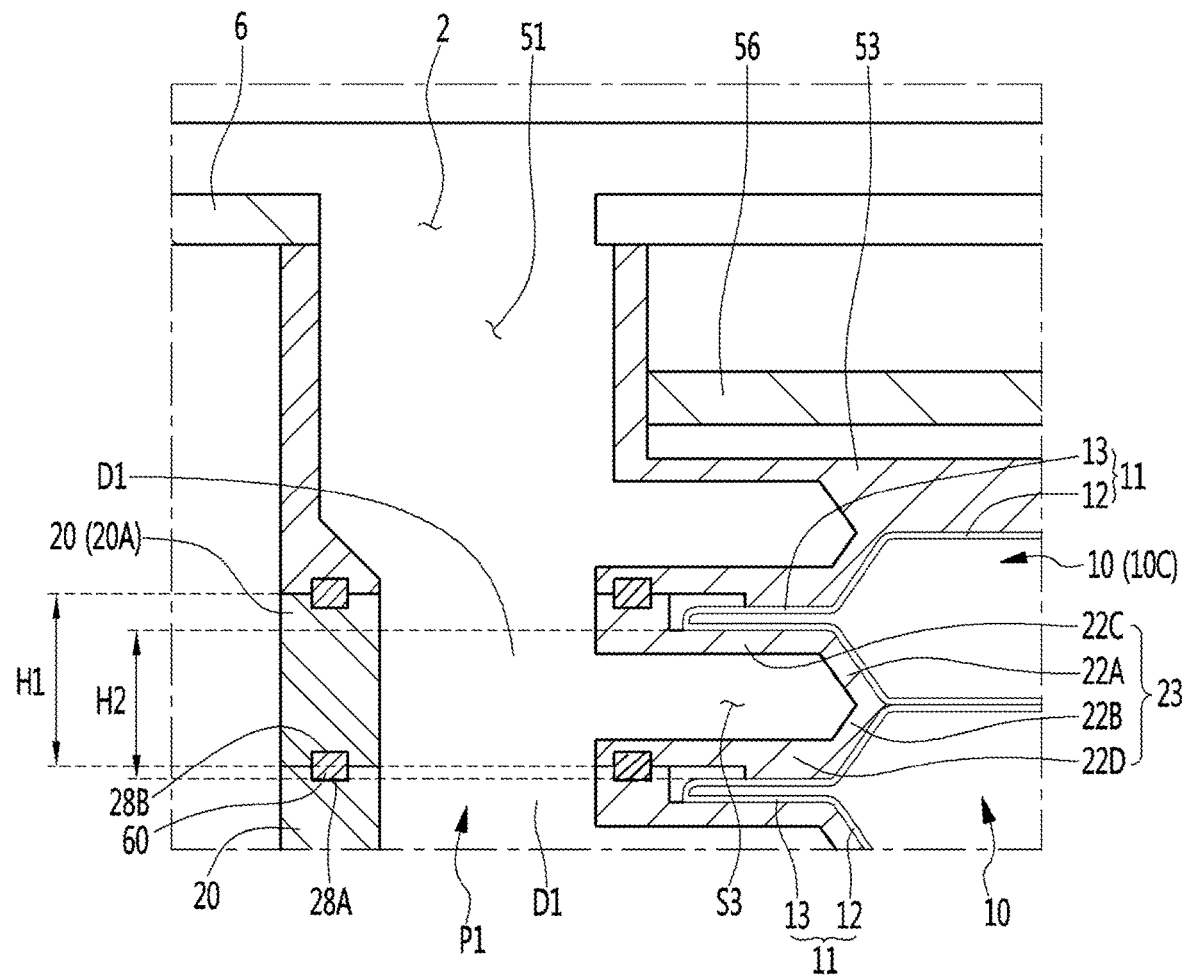
FIG. 5 is an enlarged cross-sectional view of the portion B shown in FIG. 4.
Figure 6:
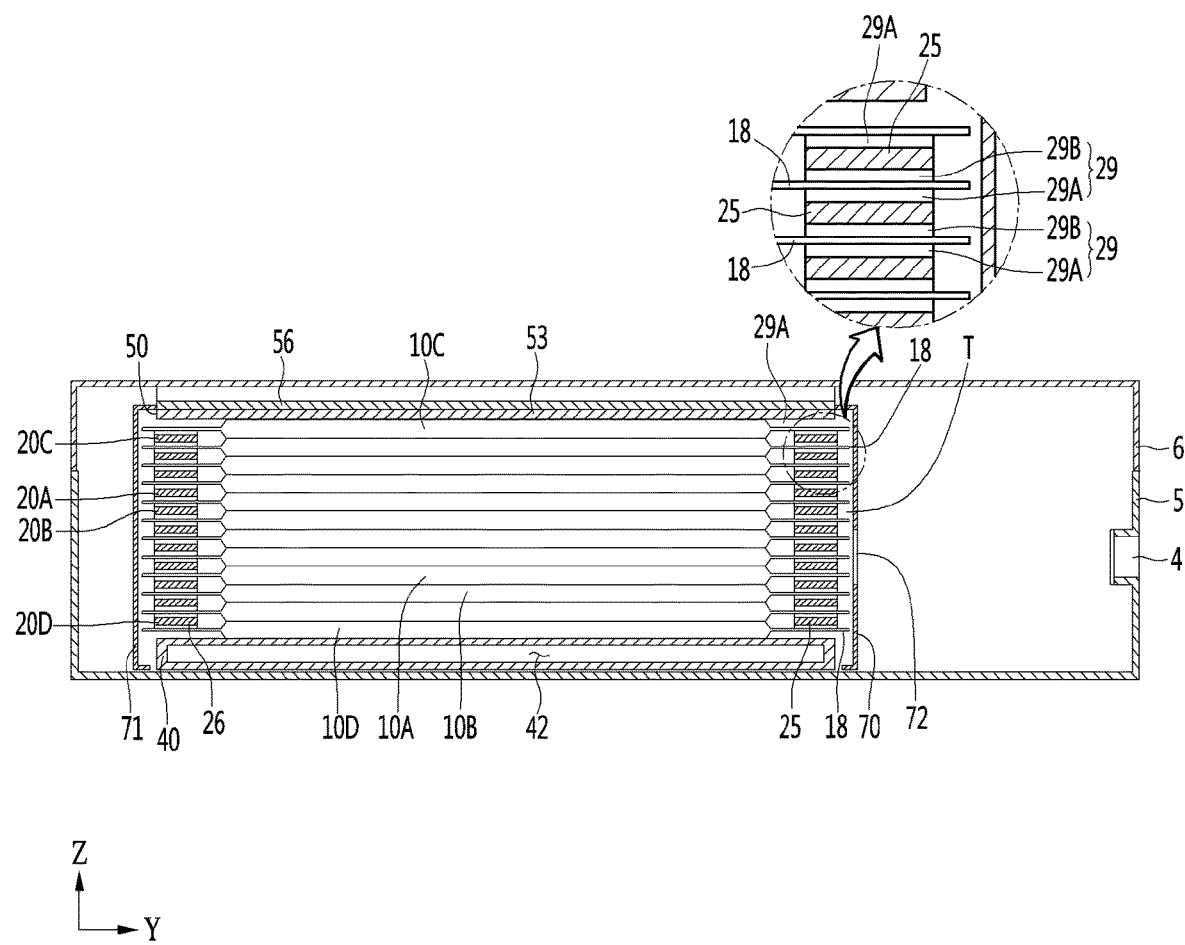
FIG. 6 is a cross-sectional view taken along line C-C' shown in FIG. 1.
Figure 7:
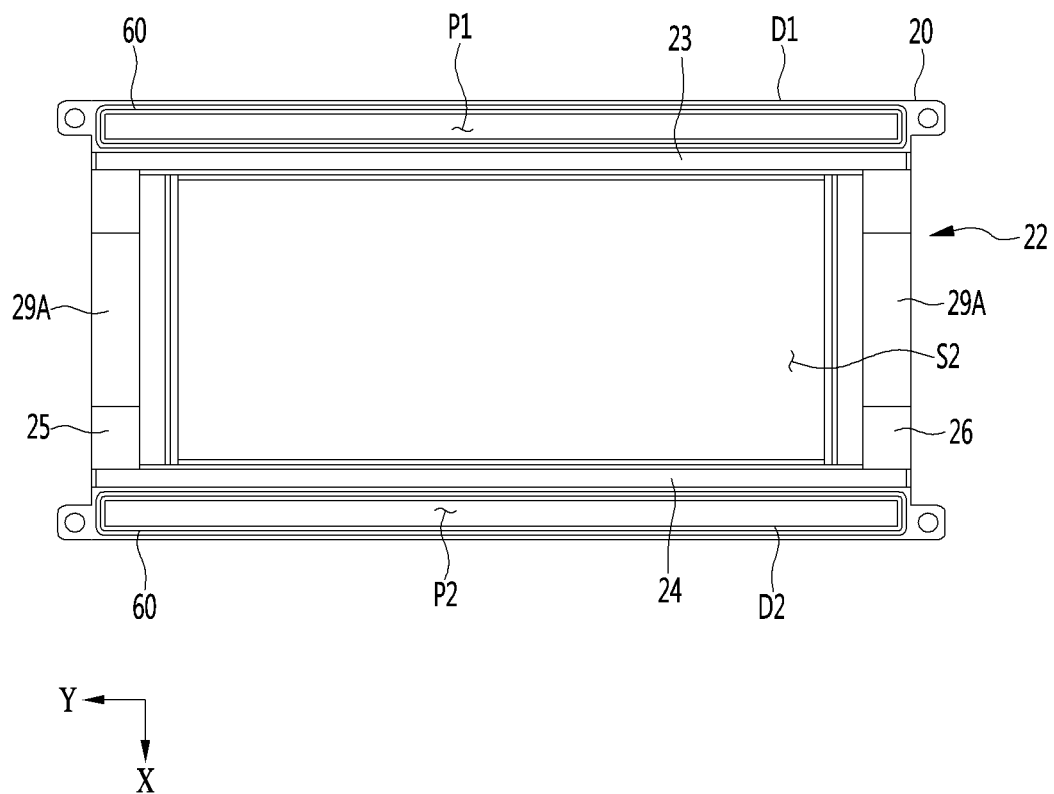
FIG. 7 is a top view of the example cartridges shown in FIGS. 3-6.

FIG. 4 is a cross-sectional view taken along line A-A' shown in FIG. 1, FIG. 5 is an enlarged cross-sectional view of the portion B shown in FIG. 4, FIG. 6 is a cross-sectional view taken along line C-C' shown in FIG. 1, FIG. 7 is a plan view of the cartridges shown in FIGS. 3-6, FIG. 8 is a perspective view of the cartridges shown in FIGS. 3-6, and FIG. 9 is a perspective view when example cartridges and example battery cells are stacked and in contact with each other.

The battery cells 10 may have the same configuration and the same configuration of the battery cells 10 is given reference number '10'.

Further, of two adjacent battery cells, the upper battery cell is given reference numeral '10A' and the lower battery cell is given reference numeral '10B'.

Further, of the battery cells 10, the uppermost battery cell is given reference numeral '10C' and the lowermost battery cell is given reference numeral '10D' in the following description.

The uppermost battery cell 10C may be an upper battery cell for the battery cell positioned right under it and is given reference numeral '10C' for the convenience of description in the following description.

Further, the lowermost battery cell 10D may be a lower cartridge for the battery cell positioned right over it and is given reference numeral '10D' for the convenience of description in the following description.

In some implementations, the battery cells 10 may be pouch type batteries. The battery cells 10 may each include an electrode assembly including an anode plate and a cathode plate, and a pouch 11 that may be made of aluminum or a laminate sheet of polymer resin and that may cover the electrode assembly.

In some implementations, the pouch 11 may be formed by bonding a pair of sheets with the electrode assembly therebetween.

The sheets may each have a cover portion 12 covering the outer side of the electrode assembly and a bonding portion 13 bending from the cover portion 12 to be bonded.

The bonding portion 13 may be formed substantially in a rectangular ring shape. The outer side of the bonding portion 13 may be the outer side of the battery cell 10.

The bonding portion 13 may horizontally protrude from the battery cell 10, and as shown in FIGS. 4 and 5, it may be inserted and supported in the gap between two vertically adjacent cartridges 20.

The battery cells 10 may be disposed in the spaces formed by the cartridges 20. The cartridges 20 may cover the fronts, rears, left sides, and right sides of the battery cells 10.

The battery cells 10 may be vertically arranged in contact with adjacent battery cells.

The battery cells 10 are vertically adjacent to each other, and the bottom of the upper battery cell 10A may face the top of the lower battery cell 10B.

Further, the bottom of the upper battery cell 10A may be seated on the top of the lower battery cell 10B and in contact with the top of the lower battery cell 10B.

In some implementations, a separate cooling plate may not be provided between adjacent battery cells, and adjacent battery cells 10 may be in contact with each other.

In some cases, a pair of cooling plates for forming a channel for air may be disposed between adjacent battery cells, so the air can remove heat transferring from the battery cells to the cooling plates while passing through the gaps between the cooling plates. The pair of cooling plates provided between adjacent battery cells may increase a size of the battery pack and an overall height of the battery pack may be increased.

In some implementations, when adjacent battery cells 10 are vertically arranged in contact with each other without a separate cooling plate between adjacent battery cells, the overall height of the battery pack P may be reduced and the battery pack P can be made compact.

The cartridges 20, as shown in FIG. 4, may be stacked such that the ducts D1 and D2 communicate with the ducts of an adjacent cartridge. The ducts D1 and D2 of the cartridges 20 may communicate with the ducts of an adjacent cartridge in the stacking direction of the cartridges 20 (in the Z-axial direction).

The duct D1 and D2 of the cartridges 20 may vertically communicate with the duct of an adjacent cartridge.

The duct D1 and D2 of an upper cartridge 20A may respectively communicate with the duct D1 and D2 of a lower cartridge 20B which is adjacent to the upper cartridge 20A and air can vertically pass through the duct D1 and D2 of the upper cartridge 20A and the duct D1 and D2 of the lower cartridge 20B.

In some implementations, one cartridge 20 may be in contact with at least one battery cell 10 and air can absorb heat of the battery cells 10 while sequentially passing through the ducts D1 and D2 of the cartridges 20.

The cartridges 20 may function as heat transmission members that can absorb heat from the battery cells 10 and transmit the heat to the air passing through the ducts D1 and D2.

The cartridges 20 each may be made of a nonmetal in a body shape. The battery cell contact body 22 and the ducts D1 and D2 may be formed by one nonmetallic body.

The material of the cartridges 20 may include a synthetic resin, for example, a plastic. The battery cell contact body 22 and the ducts D1 and D2 may be made of a synthetic resin, for example, a plastic.

Heat of a battery cell 10 may transfer to a battery cell contact body 22 that contacts the battery cell 10 and may transfer to ducts D1 and D2 from the battery cell contact body 22. The heat transferring to the ducts D1 and D2, as described above, may transfer to the air passing through the ducts D1 and D2.

Air can cool duct D1 and D2 while passing through the duct D1 and D2 and a cartridge 20 can dissipate heat through a heat transfer path connected to the duct D1 and D2 from a battery cell contact body 22.

In some implementations, the cartridges 20 can cool the battery cells 10 without separate metallic cooling plates contacting the battery cells 10. In this case, the cartridges 20 may be heat dissipation cartridges. When the material of the cartridges 20 is plastic, the cartridges 20 may be plastic heat dissipation cartridges. The cartridges 20 may be duct-integrated plastic heat dissipation cartridges.

In these implementations, since the cartridges 20 dissipate heat from the battery cells 10 using the duct D1 and D2 thereof without separate metallic cooling plates, the number of parts and the weight of the battery pack P can be reduced, as compared with a battery pack including specific metallic cooling plates. That is, the battery pack P can be made light.

Referring to FIG. 5, the height H1 of the duct D1 and D2 is greater than the height H2 of the battery cell contact body 22. The height of the upper end of the duct D1 and D2 may be greater than the height of the upper end of the battery cell contact body 22 and the duct D1 and D2 may protrude from the top of the cartridge 20.

The lower end of the duct of an upper cartridge 20A may be seated on the upper end of the duct of a lower cartridge 20B which is adjacent to the upper cartridge 20A.

The duct D1 and D2 of an upper cartridge 20A and the duct D1 and D2 of a lower cartridge 20B which is adjacent to the upper cartridge 20A may be in contact with each other.

One duct or a plurality of ducts may be formed at each of the cartridges 20.

In some implementations, one duct is formed at each of the cartridges 20, and air can cool the cartridges 20 one time while passing through the cartridges 20.

In some implementations, a plurality of ducts is formed at each of the cartridges 20, and air can remove the heat of the cartridges several times.

Heat from a battery cell 10 can be horizontally transferred through the cartridge 20, and the ducts D1 and D2 of the cartridge 20 may be spaced from each other with the battery cell 10 therebetween.

In some implementations, a pair of ducts may be spaced apart from each other at each of the cartridges, in which air can dissipate heat around any one D1 of ducts D1 and D2 while passing through the duct D1 and can dissipate heat around the other one D2 of the ducts D1 and D2 while passing through the duct D2.

When a pair of ducts D1 and D2 is formed at a cartridge 20, the heat transferring to both sides of the battery cell 10 from the battery cell 10 can be distributed and dissipated through the ducts D1 and D2. The pair of ducts D1 and D2 may be spaced from each other at each of the cartridges 20.

In some implementations, the ducts D1 and D2 may be formed such that a battery cell space S2 for keeping a battery cell 10 may be formed within a battery cell contact body 22.

The ducts D1 and D2 may be spaced from each other with the battery cell space S2 therebetween.

Regarding the cartridges 20, the ducts of upper cartridges 20A and the ducts of lower cartridges 20B vertically communicate with each other, so the cartridges 20 may form vertically long air passages.

A first duct D1 and a second duct D2 may be formed at each of the cartridges 20. A vertically long first air passage P1 may be formed by the first ducts D1 of the cartridges 20 that vertically communicate with each other.

Further, another vertically long second air passage P2 may be formed by the second ducts D2 of the cartridges 20 that vertically communicate with each other.

The first air passage P1 and the second air passage P2 may be open in parallel with each other with the battery cells 10 therebetween.

The first air passage P1 formed by the first ducts D1 of the cartridges 20 may be positioned under the outer intake hole 2 shown in FIG. 1. In this case, the first air passage P1 formed by the first ducts D1 may function as an intake heat dissipation channel for air to primarily or initially cool the cartridges 20.

Further, the second air passage formed by the second ducts D2 of the cartridges 20 may be positioned under the outer exhaust hole 3 shown in FIG. 1. In this case, the second air passage P2 formed by the second ducts D2 may function as an exhaust heat dissipation channel for air to secondarily or subsequently cool the cartridges 20.

A battery cell contact body 22 is described in detail with reference to FIGS. 7 to 9.

An open battery cell space S2 that may receive a battery cell 10 may be formed inside the battery cell contact body 22.

The battery cell contact body 22 may surround and protect the edges of the battery cell 10. The battery cell space S2 may be open at the top and bottom.

The battery cell contact body 22 may have a pair of contact portions 23 and 24 protruding from the ducts D1 and D2 and a pair of bridges 25 and 26 connecting the contact portions 23 and 24.

In some implementations, the battery cell contact body 22 may be formed in a rectangular ring frame shape, which may be defined by the contact portions 23 and 24 and the bridges 25 and 26.

The contact portions 23 and 24 may protrude horizontally from sides of the ducts D1 and D2. The contact portions 23 and 24 may be spaced from each other in a width direction or the spacing direction of the ducts D1 and D2 (in the X-axial direction).

The contact portions 23 and 24 may include a first contact portion 23 protruding from the first duct D1 and a second contact portion 24 protruding from the second duct D2.

The first contact portion 23 and the second contact portion 24 may be spaced from each other in the left-right direction or in the front-rear direction.

The first contact portion 23 may protrude toward the second duct D2 from the side, which faces the second duct D2, of four sides of the first duct D1.

Further, the second contact portion 24 may protrude toward the first duct D1 from the side, which faces the first duct D1, of four sides of the second duct D2.

The contact portions 23 and 24 may be symmetrically formed with the battery cell space S2 therebetween.

Figure 8:
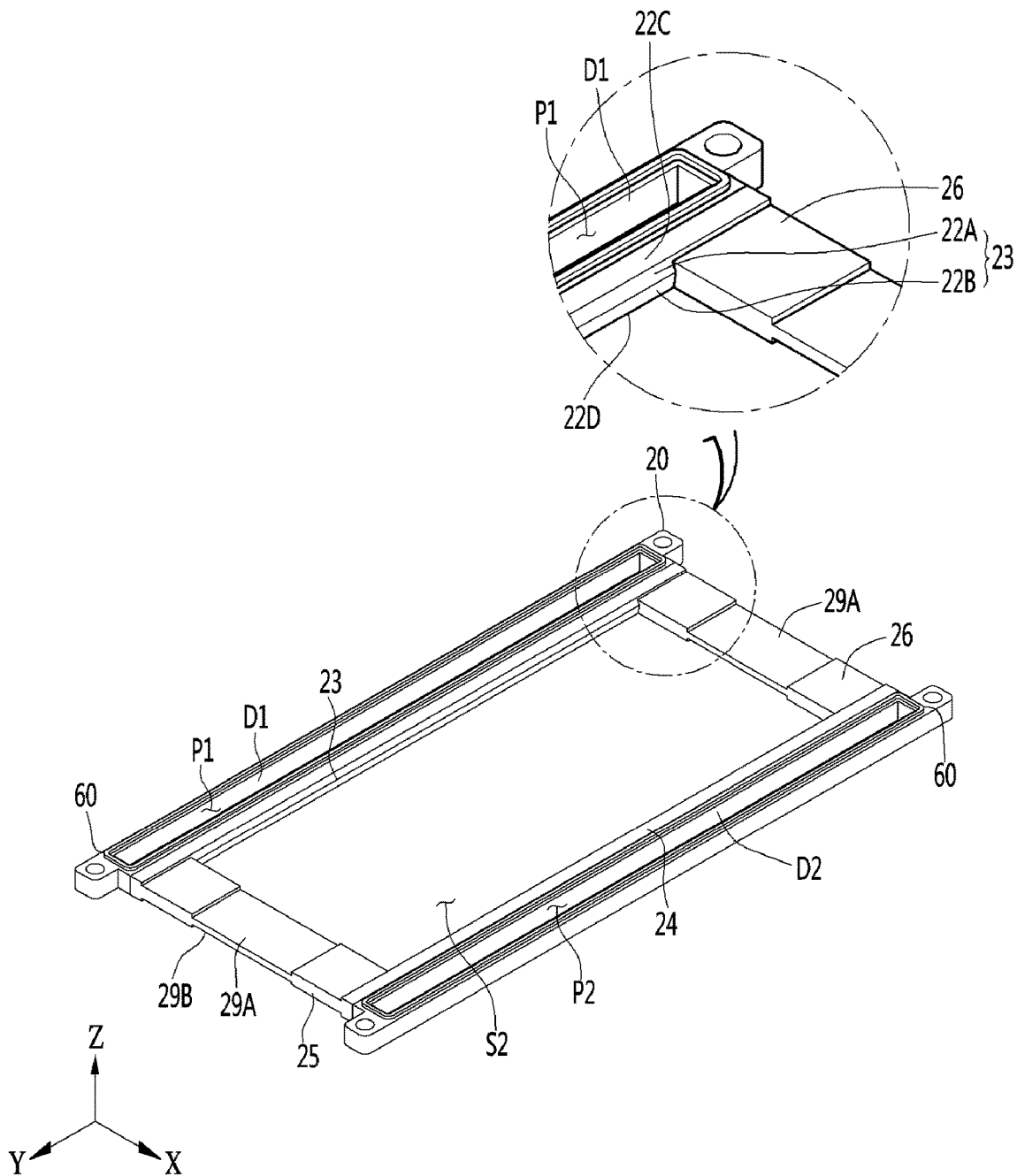
FIG. 8 is a perspective view of the example cartridges shown in FIGS. 3-6.
Figure 9:
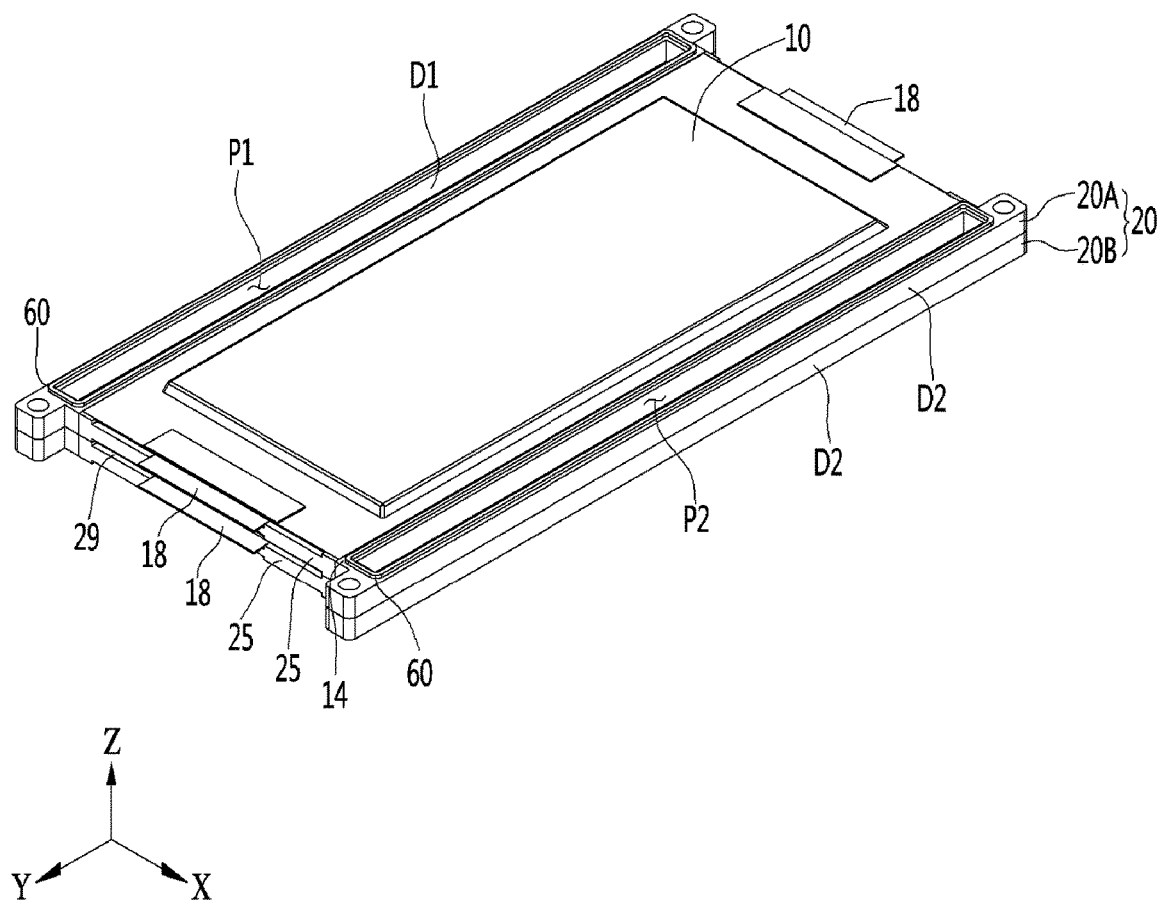
FIG. 9 is a perspective view showing example cartridges and example battery cells that are stacked and in contact with each other.

Referring to FIGS. 5 and 8, the contact portions 23 and 24 may each have one or more inclined portions 22A and 22B and horizontal portions 22C and 22D connecting the inclined portion 22A and the ducts D1 and D2.

The contact portions 23 and 24 may include a pair of inclined portions 22A and 22B that are inclined in opposite directions and connected to each other at ends.

Vertical cross-section views of the inclined portions 22A and 22B may include a '>' shape.

The inclined portions 22A and 22B may be in contact with different battery cells 10. For example, referring to FIG. 5, of a pair of inclined portions 22A and 22B, the upper inclined portion 22A may be in contact with an upper battery cell 10A and the lower inclined portion 22B may be in contact with a lower battery cell 10B.

That is, the contact portions 23 and 24 may be in contact with a pair of battery cells 10A and 10B, respectively, and the battery cell contact body 22 can receive heat from the battery cells.

The contact portions 23 and 24 each may further have an upper horizontal portion 22C that horizontally extends from the upper end of the upper inclined portion 22A of the inclined portions 22A and 22B and is connected to the ducts D1 and D2.

The contact portions 23 and 240 each may further have a lower horizontal portion 22D that horizontally extends from the lower end of the lower inclined portion 22B of the inclined portions 22A and 22B and is connected to the ducts D1 and D2.

When the contact portions 23 and 24 each has both of the upper horizontal portion 22C and the lower horizontal portion 22D, as shown in FIG. 5, a gap S3 through which air flowing through the ducts D1 and D2 can flow inside and outside may be formed between the upper horizontal portion 22C and the lower horizontal portion 22D.

Some of the air vertically passing through the ducts D1 and d2 may flow into the gap S3 and directly absorb heat of the inclined portions 22A and 22B, so the air cooling effect can be increased.

In these implementations, the contact portions 23 and each has both of the upper horizontal portion 22C and the lower horizontal portion 22D. In some implementations, the contact portions 23 and 24 may have one of the upper horizontal portion 22C or the lower horizontal portion 22D.

The upper horizontal portion 22C and the lower horizontal portion 22D may function as heat transmission portions that can transmit heat has been transferred from battery cells 10 to the inclined portions 22A and 22B and to the ducts D1 and D2.

The bonding portion 13 of a pouch 11 may be fitted between the lower horizontal portion 22D of an upper cartridge 20A and the upper horizontal portion 22C of a lower cartridge 20B which is adjacent to the upper cartridge 20A.

The bonding portion 13 of the pouch 11 may be in surface contact with the lower horizontal portion 22D on the top and the upper horizontal portion 22C on the bottom, the lower horizontal portion 22D and the upper horizontal portion 22C may receive heat from the bonding portion 13 of the pouch 11, and the heat of battery cells 10 can more quickly transfer to the ducts D1 and D2.

The bridges 25 and 26 may be spaced from each other perpendicular to the spacing direction of the ducts D1 and D2 (in the Y-axial direction).

The bridges 25 and 26 may be spaced from each other in the Y-axial direction perpendicular to the spacing direction of the contact portions 23 and 24 (the X-axial direction) without being in direct contact with the ducts D1 and D2.

The base 40 is described hereafter.

The lowermost cartridge 20D of the cartridges may be seated on the base 40, as shown in FIG. 4. A return channel 42 connecting the ducts D1 and D2 of the lowermost cartridge 20D may be formed in the base 40.

The return channel 42 may have an inlet 43 positioned under any one of the ducts D1 or D2 of the lowermost cartridge, an outlet 44 positioned under the other one of the ducts D1 and D2 of the lowermost cartridge, and a connection channel 45 connecting the inlet 43 and the outlet 44.

A recessed seat 46 where the lowermost battery cell disposed inside the lowermost cartridge 20D is seated may be formed on the top of the base 40.

The lowermost battery cell 10D in the lowermost cartridge 20D is a battery cell that is positioned lowest of the battery cells and the bottom of the lowermost battery cell 10D may be inserted in the seat 46 with the top of the edge in contact with the battery cell contact body 22 of the lowermost cartridge 20A. The bottom of the lowermost battery cell 10D may be in contact with the seat 46.

The top plate 50 is described hereafter.

The top plate 50, as shown in FIG. 4, may have an upper intake duct 51 that can communicate with any one of the ducts D1 and D2 of the uppermost cartridge 20C and an upper exhaust duct 52 that can communicate with the other one of the ducts D1 and D2 of the uppermost cartridge 20C.

In some implementations, the upper intake duct 51 and the upper exhaust duct 52 of the top plate 50 may have the same shape as the ducts of the uppermost cartridge 20C.

The top plate 50 may further have a cover plate 53 that connects the upper intake duct 51 and the upper exhaust duct 62 and covers the top of the uppermost battery cell 10C in the uppermost cartridge 20C.

The upper intake duct 51 may be positioned between the first duct D1 of the uppermost cartridge 20C and the top of the upper case 6 and can guide the air flowing inside through the outer intake hole 2 of the upper case 6 into the first duct D1 of the uppermost cartridge 20C.

The upper exhaust duct 52 may be positioned between the second duct D2 of the uppermost cartridge 20C and the top of the upper case 6 and can guide the air that has passed through the second duct D2 of the uppermost cartridge 20C into the outer exhaust hole 3.

In some implementations, the battery pack P may further include a pressing plate 56 coupled to the top plate 50 to press the top plate 50 to the uppermost battery cell 10C.

The outer intake hole 2 of the upper case 6 may be positioned over the upper intake duct 51. The outer exhaust hole 3 of the upper case 6 may be positioned over the upper exhaust duct 52.

The air that has passed through the outer intake hole 2 can pass through the upper intake duct 51 of the top plate 50 and then flow into any one D1 of the ducts D1 and D2 of the uppermost cartridge 20C.

The air that has passed through any one D1 of the ducts D1 and D2 of the uppermost cartridge 20C can pass through the upper exhaust duct 52 of the top plate 50 and then pass through the outer exhaust hole 3.

The entire channel for air that cools the battery cells may be formed by the first air passage P1 elongated downward in the battery pack P, the return channel 42 connected to the lower end of the first air passage P1 and horizontally elongated under the lowermost battery cell 10, and the second air passage P2 connected to the return channel 42 and elongated upward in the battery pack P.

The overall air channel formed by the first air passage P1, the return channel 42, and the second air passage P2 may have a U-shape and cover the left and right sides of the area where the battery cells are disposed.

In some implementations, the battery pack P is configured such that the gas G discharged from the battery cells 10 does not flow into the air passages P1 and P2. In this case, it is possible to prevent the gas G from flowing into the interior of a vehicle through the air passages P1 and P2 and the exhaust ducts.

In some implementations, a gas exhaust passage 29 for discharging the gas from the battery cells 10 may be formed between adjacent cartridges 20.

The gas exhaust passages 29 may be open in the Y-axial direction perpendicular to the opening direction of the ducts D1 and D2 (the Z-axial direction).

In some implementations, the gas from the battery cell 10 may be horizontally discharged.

The battery cells 10 each may have protrusive cell leads 18. The cell leads 18, as shown in FIG. 9, may protrude from sides 15 perpendicular to the sides 14 facing ducts D1 and D2 of the edges of a battery cell 10. In some cases, the cell leads 18 may be formed on the sides 14, which face ducts D1 and D2, of each battery cell 10.

The cartridges 20 each may have seating grooves 29A and 29B for receiving cell leads 18.

The gas exhaust passage 29 may be formed between the seating groove 29B of an upper cartridge 20A of adjacent cartridges 20 and the seating groove 29A of the lower cartridge 20B.

Referring to FIG. 6, a gap T through which air that has passed out of the gas exhaust passage 29 can flow may be formed between the inner cover 70 and the battery cells 10 and the gas G in the gap can flow out of the outer gas exhaust hole 4 after sequentially passing through the inner gas exhaust hole 72 of the inner cover 70 and between the inner cover 70 and the outer case.

The battery pack P may further include at least one sealing member 60. The sealing members 60 can seal the portions between the ducts D1 and D2 of an upper cartridge 20A and the ducts D1 and D2 of a lower cartridge 20B which is adjacent to the upper cartridge 20A.

The gas that has sequentially passed through the gas exhaust passage 29 and the gas exhaust hole 72 can pass between the inner cover 70 and the outer case 1, and when the gas flows into the gaps between the ducts D1 and D2 of adjacent cartridges 20, the gas may flow into the air passages P1 and P2.

The sealing members 60 can prevent the gas G from flowing inside between ducts D1 and D2 that vertically communicate with each other and the channels P1, P2, and 42 through which air passes in the battery pack P can be separated from the channels through which gas can flow in the battery pack P.

Sealing member grooves 28A and 28B in which the sealing members 60 are inserted may be formed on the top and bottom of each of the cartridges 20.

The sealing members 60 may be formed in a rectangular ring shape larger than the ducts D1 and D2, and in this case, one sealing member can seal a duct.

In some implementations, one cartridge may have two ducts D1 and D2, and two sealing members 60 may be provided for one cartridge.

The above description is an example that explains the spirit of the present disclosure and may be changed and modified in various ways without departing from the basic features of the present disclosure by those skilled in the art.

Accordingly, the implementations described herein are provided not to limit, but to explain the spirit of the present disclosure and the spirit and the scope of the present disclosure are not limited by the implementations.

The protective range of the present disclosure should be construed on the basis of claims and all the technical spirits in the equivalent range should be construed as being included in the scope of the right of the present disclosure.

What is claimed is:

1. A battery pack comprising:
a lower case;
an upper case that covers a top portion of the lower case;
a plurality of cartridges that are disposed in at least one of the lower case or the upper case and that are stackable in a vertical direction, each cartridge of the plurality of cartridges extending in a longitudinal direction perpendicular to the vertical direction;
a top plate disposed vertically above an uppermost cartridge among the plurality of cartridges;
an inner cover that faces sides of the plurality of cartridges; and
a plurality of battery cells in which each battery cell is disposed in a cartridge of the plurality of cartridges,
wherein each cartridge of the plurality of cartridges includes:
a battery cell contact body that is configured to contact a battery cell of the plurality of battery cells and support the battery cell, and
at least one duct that is configured to transmit heat from the battery cell contact body to aft by passing aft through the at least one duct the at least one duct comprising a pair of ducts defined in the uppermost cartridge,
wherein each duct of the plurality of cartridges is configured to communicate aft with another duct of an adjacent cartridge,
wherein the plurality of cartridges define gas exhaust passages, each of the gas exhaust passages being defined between adjacent cartridges and configured to discharge gas from the battery cells in a direction perpendicular to an opening direction of the at least one duct, wherein the top plate comprises:
an upper intake duct configured to communicate with a first duct of the pair of ducts of the uppermost cartridge, and
an upper exhaust duct configured to communicate with a second duct of the pair of ducts of the uppermost cartridge,
wherein the upper case defines:
an outer intake hole located vertically above the upper intake duct, and
an outer exhaust hole located vertically above the upper exhaust duct, wherein
the lower case defines an outer gas exhaust hole that is oriented in a direction different from opening directions of the outer intake hole and the outer exhaust hole,
wherein the inner cover is spaced apart from the sides of the plurality of cartridges to thereby define a gap that allows flow of gas that has passed through the gas exhaust passages,
wherein the inner cover defines an inner gas exhaust hole that is configured to discharge the gas from the gap toward the outer gas exhaust hole;
wherein each duct of the plurality of cartridges has a lower end and an upper end, the upper end being configured to seat a lower end of a duct from an adjacent cartridge;
wherein each duct of the plurality of cartridges is configured to vertically communicate air with ducts of adjacent cartridges that are stacked above and below;
wherein the top plate further includes a cover plate that extends from the upper intake duct to the upper exhaust duct and that covers at least a portion of an uppermost battery cell disposed in the uppermost cartridge; and
wherein the upper intake duct and the upper exhaust duct protrude upward from the cover plate in the vertical direction.

2. The battery pack of claim 1, wherein the battery cell contact body and the duct are integrally formed of a non-metallic material, and
wherein the duct protrudes upward relative to the battery cell contact body.

3. The battery pack of claim 1, wherein the battery cell has an upper surface that contacts a lower surface of an adjacent battery cell stacked above the battery cell.

4. The battery pack of claim 1, wherein each cartridge of the plurality of cartridges includes a pair of ducts that are spaced apart from each other in a width direction perpendicular to the longitudinal direction.

5. The battery pack of claim 4, wherein the battery cell contact body is configured to receive the battery cell in a battery cell space defined between the pair of ducts.

6. The battery pack of claim 4, wherein the battery cell contact body includes:

a pair of contact portions that protrude from a side surface of the pair of ducts, the pair of contact portions being spaced apart from each other in the width direction and extending in the longitudinal direction; and
a pair of bridges that connect the pair of contact portions to each other, the pair of bridges being spaced apart from each other in the longitudinal direction and extending in the width direction.

7. The battery pack of claim 4, further comprising a base that defines a return channel configured to communicate with a pair of ducts of a lowermost cartridge.

8. The battery pack of claim 7, wherein the return channel includes:
an inlet positioned under a first duct of the pair of ducts of the lowermost cartridge;
an outlet positioned under a second duct of the pair of ducts of the lowermost cartridge; and
a connection channel connecting the inlet to the outlet.

9. The battery pack of claim 7, wherein the base is configured to seat the pair of ducts of the lowermost cartridge.

10. The battery pack of claim 7, wherein the base defines a recessed seat configured to receive a lowermost battery cell that is disposed in the lowermost cartridge.

11. The battery pack of claim 1, further comprising a pressing plate that is coupled to the top plate and configured to provide a pressure to the top plate and to the uppermost cartridge.

12. The battery pack of claim 1, wherein each of the battery cells includes cell leads that protrude in the longitudinal direction,
wherein each cartridge of the plurality of cartridges includes seating grooves that are configured to receive the cell leads, and
wherein the gas exhaust passages are defined between the seating grooves of the adjacent cartridges.

13. The battery pack of claim 1, further comprising one or more sealing members that are configured to provide a seal between the ducts of the plurality of cartridges based on the plurality of cartridges being stacked.

14. The battery pack of claim 13, wherein each cartridge of the plurality of cartridges defines sealing member grooves on top and bottom surfaces of the cartridge, the sealing member grooves being configured to receive the sealing members.

15. The battery pack of claim 1, wherein the outer intake hole and the outer exhaust hole are open in the vertical direction, and
wherein the outer gas exhaust hole is open in the longitudinal direction perpendicular to the vertical direction.

* * * * *